United States Patent [19]

Lortz

[11] Patent Number: 4,999,206

[45] Date of Patent: Mar. 12, 1991

[54] METHOD FOR FORMING THREE DIMENSIONAL FOOD PRODUCTS

[75] Inventor: James L. Lortz, Modesto, Calif.

[73] Assignee: Food Forming Corporation, Reno, Nev.

[21] Appl. No.: 447,203

[22] Filed: Dec. 7, 1989

Related U.S. Application Data

[62] Division of Ser. No. 117,659, Nov. 6, 1987, Pat. No. 4,886,441.

[51] Int. Cl.⁵ .............................................. A23P 1/00
[52] U.S. Cl. .................................... 426/512; 426/285
[58] Field of Search ............... 426/512, 285; 425/236, 425/237, 362, 363, DIG. 5, 308, 195

[56] References Cited

U.S. PATENT DOCUMENTS 2,705,462  4/1955  Reinhard ............................ 425/236

FOREIGN PATENT DOCUMENTS 62-91148  4/1987  Japan ................................. 425/237

Primary Examiner—George Yeung
Attorney, Agent, or Firm—George W. Wasson

[57] ABSTRACT

A method and apparatus for forming food materials into three dimensional shapes that may be made to duplicate the appearance of a variety of natural food products. The machine comprises a dual rotary, matching forming cavity apparatus for producing, at continuous high speeds, food products in a variety of shapes. One embodiment of the invention employs a plurality of forming bars mounted in the dual rotary drums of the machine, the forming bars are easily removable and replacable with similar bars having different product forming cavities. Cam operated means are associated with the drums or the forming bars for ejecting formed products from the cavities.

3 Claims, 3 Drawing Sheets

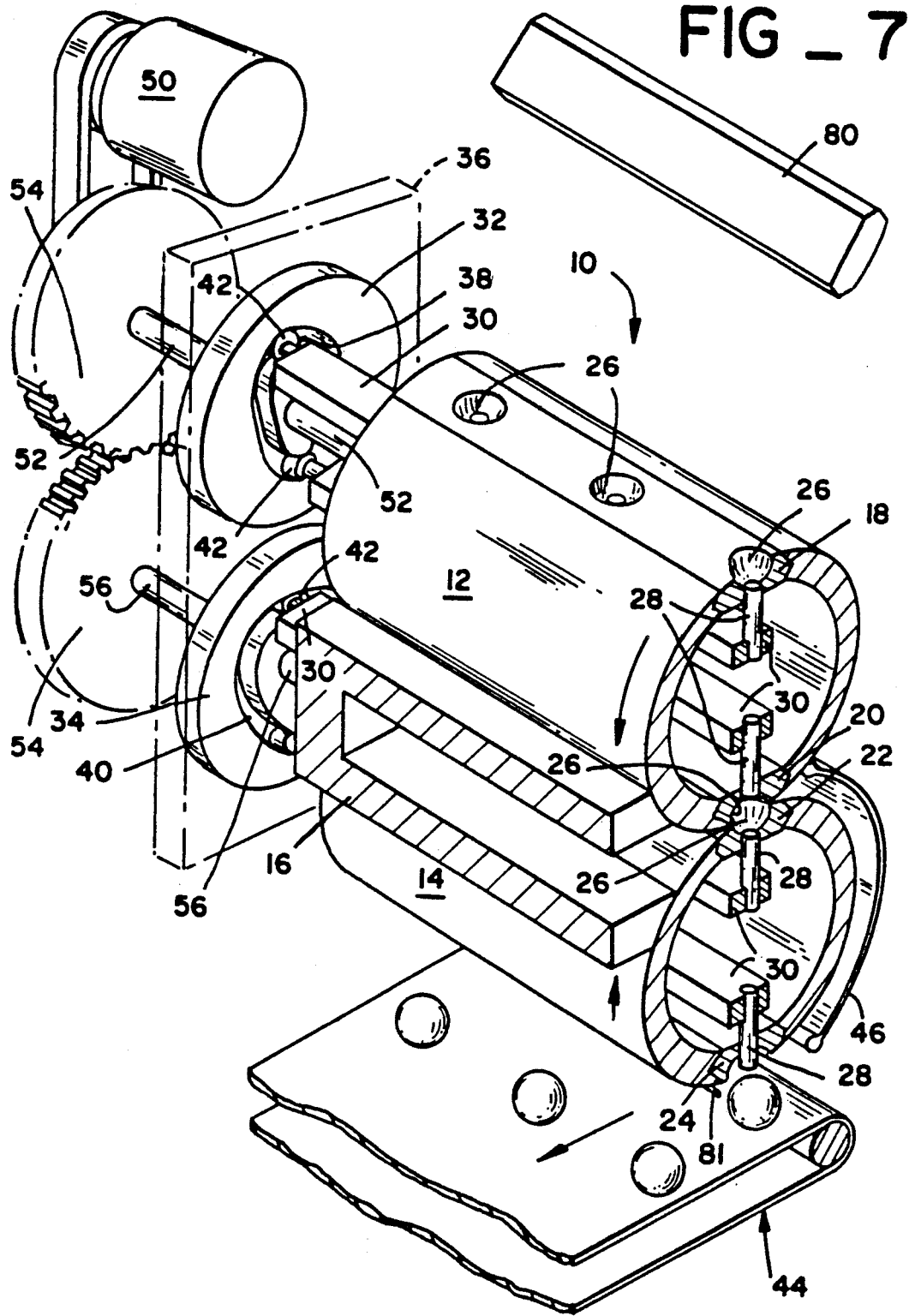
FIG_7
FIG_1

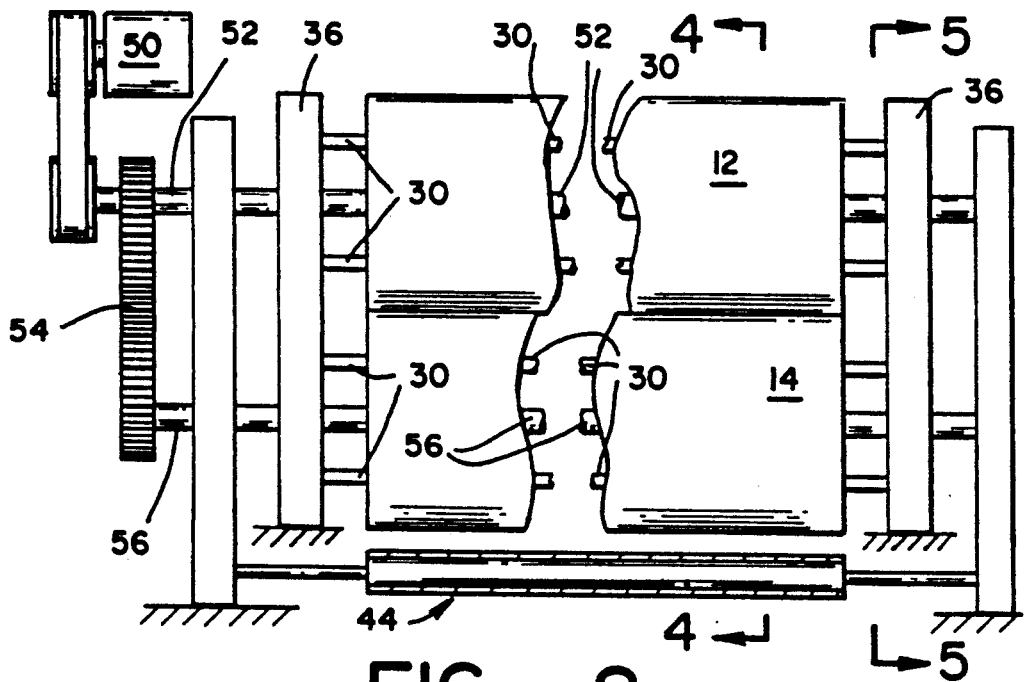
FIG_2
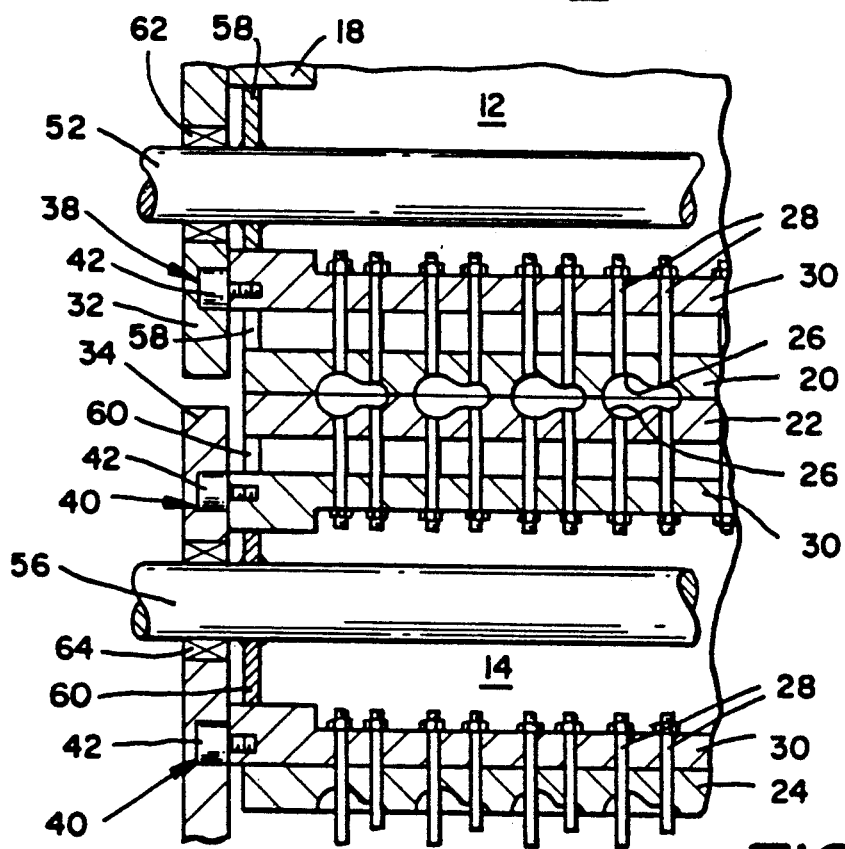
FIG_6

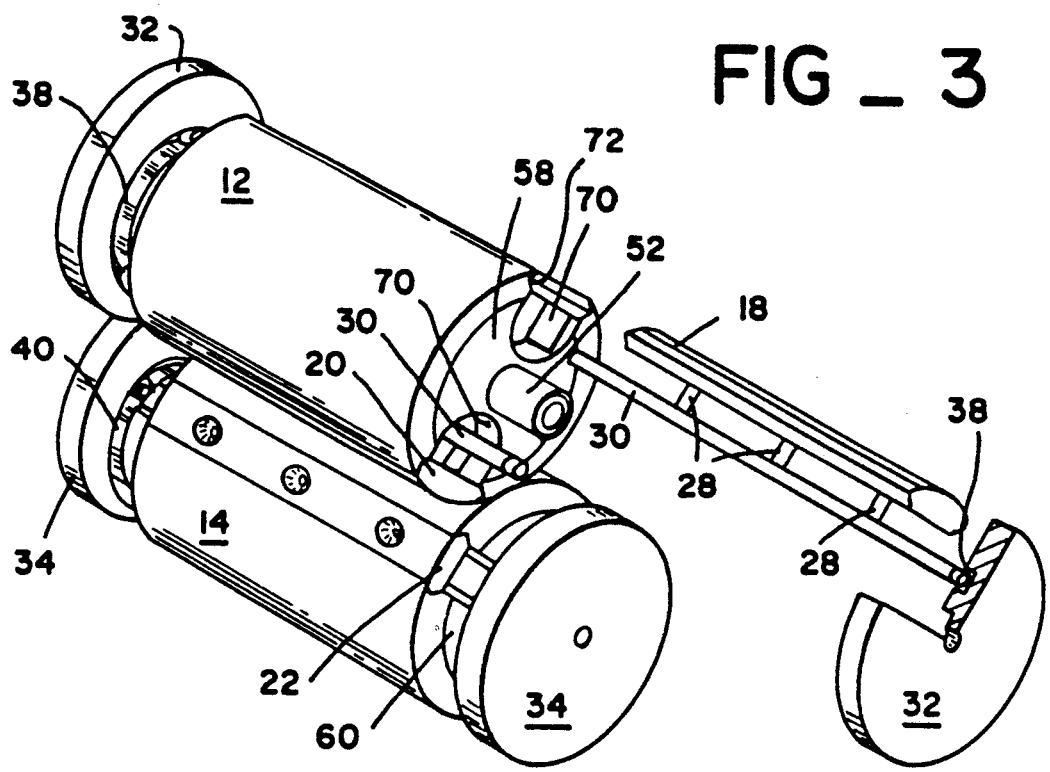
FIG_3
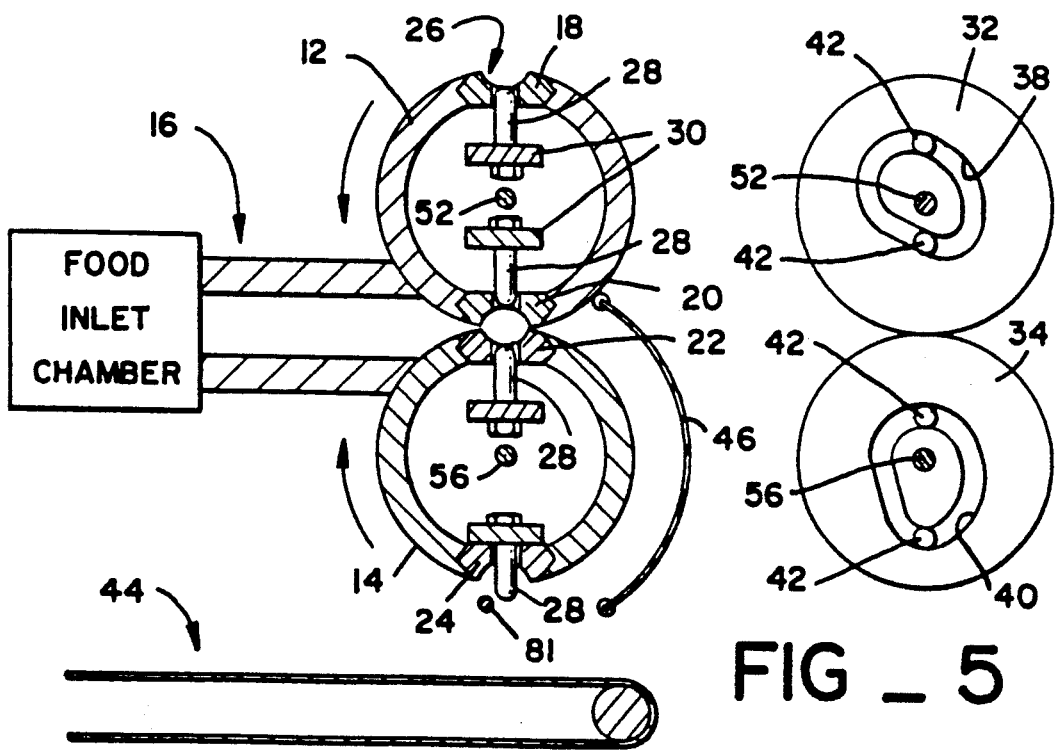
FIG_4
FIG_5

4,999,206

METHOD FOR FORMING THREE DIMENSIONAL FOOD PRODUCTS

This application is a division of application Ser. No. 117,659, filed Nov. 6, 1987 now U.S. Pat. No. 4,886,441.

This invention relates to a method and apparatus for forming food materials into three dimensional food products. More particularly, the method and machine are useful in forming food products into a variety of three dimensional forms from a formable feed stock, changes in the form of the product are easily made by changing only a part of the machine.

BACKGROUND OF THE INVENTION

Machines for forming food products from a food base feed stock are well known. Most such machines form the products in wafers, patties or other forms that in no way resembles a familiar form for a part of the stock from which the feed stock was produced In many cases the formed product is merely a compaction of the feed stock in a form that is most easily formed by the machine or a form that is stamped or cut from a sheet of feed stock Various methods and machines have been developed over the years for shaping food materials to enhance their value and marketability. Some of those methods have utilized the single rotary concept with forming cavities in one roll only with another roll serving only as an applicator roll and functioning only to fill the cavities in the forming roll and to compress the feed material. In all such machines known to the present inventor, the forming cavities are an integral part of the roll structure and changes in the forming cavities are only effected by changing the entire forming roll. Those machines with the forming cavity as an integral part of the roll structure have had the limitation of forming only two dimensional products, and a lack of versatility in changing from one product form to another, and for those reasons those machines have been uneconomic in serving the food forming industry.

It has become desirable to form food articles in three dimensional forms that resemble a part of the source of the feed stock. For instance, it is desirable to form chicken feed stock in the form of drum sticks or breasts, or to form fish feed stock in the form of small fish, or to form shrimp feed stock in the form of shrimp.

Food processors do not wish to have machines dedicated to the formation of a single food product and would prefer to have a machine that can be easily adapted or changed from forming one product into a machine for forming another product. Quick changes from one form to another form are desirable, not only because quick changes are less labor intensive but also because the time taken to effect the change reduces the time spent in the formation of food products.

In light of these desires within the food product forming industry there has developed a need for a universal food product forming machine that may be adapted to the formation of many different food products with the changes between food products being made easily and with a minimum of equipment.

The object of the present invention is a method for forming three dimensional food products from a feed stock of food materials with a machine that is adapted to form a variety of food forms and is adapted to be changed from one food form to another with a minimum of effort and time.

A further object in accord with the preceding object is a food forming machine that will form three dimensional food objects from a feed stock and will take an input of compressible feed stock, form that stock into the desired product, and eject the formed product from the forming machine.

A further object in accord with the preceding object is a rotary food product forming machine that will continuously receive feed stock, form the stock into a desired form, and eject the formed stock from the rotary machine in preparation for the formation of the next food product.

SUMMARY OF THE INVENTION

The present invention is a rotating dual drum food product forming machine that is capable of forming food products in three dimensional or two dimensional forms on a continuous basis. The forming parts of the machine are easily changeable without completely disassembling the machine. The machine and its method of operation are capable of increasing the production of formed food products and permitting the formation of three dimensional products in a variety of forms.

Other objects and features of the invention will be readily apparent to those skilled in the art from the appended drawings and specification illustrating a preferred embodiment wherein FIG. 1 is a perspective view, partially in section, of the essential elements of the present invention.

FIG. 2 a front elevational view of the dual food product forming barrels of one form of the present invention.

FIG. 3 is an exploded perspective view, partially in section, illustrating the forming barrels including food forming bars.

FIG. 4 is a sectional view through the food forming barrels taken generally along the lines 4—4 of FIG. 2.

FIG. 5 is a sectional view taken generally along the lines 5—5 of FIG. 2 and illustrating the cams and cam followers of the present invention.

FIG. 6 is a sectional view through the center of the dual food forming barrels of FIG. 1.

FIG. 7 is a perspective view of an alternative form of a forming bar.

DETAILED DESCRIPTION OF THE INVENTION

FIG. 1 is a general overall assembly drawing illustrating the essential parts of the present invention. It should be understood that some of the conventional parts of a machine to perform the method of the present invention are not shown, but such parts do not form an essential part of the invention. For example, it should be understood that the dual rotary cylindrical forming barrels would be supported on some form of bearing support to permit them to rotate about parallel axes and that the drive mechanism for the apparatus would have to be supported on a suitable frame that would also support the bearings for the forming barrels. Also, while only one side of the support elements are shown in FIG. 1 it should be evident that duplicated bearing supports or cams and cam followers are at the side not shown.

The essential parts of the machine 10 of the present invention are the pair of parallel, cylindrical forming barrels 12 and 14, with 12 being the upper barrel and 14 the lower barrel. The barrels are each supported on their own central shaft, not shown in this FIG, so as to rotate parallel to each other in the direction of the arrows shown on the front face of the barrels. A food material input chamber 16 is shown as a hollow rectangular input chute for the entry of food materials to the rotating barrels. It should be understood that the food material input chamber is connected to a source of fluid like or plastic flowable food materials that are to be formed by the machine of the present invention.

FIG. 1 illustrates one form of the apparatus in accord with the present invention wherein, along the exterior of the forming barrels 12 and 14 are a suitable plurality of mating forming bars here shown as four, 18, 20, 22 and 24. Bars 18 and 20 are in the upper barrel and 22 and 24 in the lower barrel; bars 20 and 22 are shown in mating alignment with each other and bars 18 and 24 will rotate to mating alignment as the barrels are rotated.

Each of the forming bars are formed with a suitable plurality of cut-out portions defining cavities 26 along the bars. The cavities constitute half forms of a three dimensional food product that is to be formed by the machine of the present invention. It is not evident from FIG. 1, but it will be shown in later views, that each of the bars has the same number of cavities and the cavities become aligned with each other as the bars align during their rotation.

Inside each of the cavities and inwardly of the bars and barrels is a movable means in the form of a piston 28 that passes through a hole in the bar and into the cavity. The movable piston means is suitably fixed to a piston bar 30 so as to move radially within the barrel with movement of the piston bar. The piston bars 30 are rotated with the barrels 12 and 14, by means not shown in this FIG, and are free to move radially within the barrels as they rotate with the barrels.

To the left of the forming barrels 12 and 14, as shown in FIG. 1, are a pair of cam members 32 and 34; each cam member, being suitably supported in a cam support 36 here shown in phantom. The cam members have individual cam tracks 38 and 40 formed in the face of the cam members 32 and 34, respectively.

As shown in FIG. 1, the ends of the piston bars 30 terminate in a cam follower 42 that fits within and follows the path of the cam tracks 38 or 40. As the barrels 12 and 14 rotate the piston bars 30 rotate with the barrels and the cam followers 42 at the ends of the piston bars 30 follow the tracks 38 or 40 and thus move the piston bars radially within the barrels. That radial movement moves the pistons 28 within the cavities at desirable times in the rotation of the barrels.

FIG. 1 also illustrates, conceptually, a drive mechanism for rotation of the cylindrical forming barrels 12 and 14. As here illustrated, a motor 50 (with suitable controls, not shown) provides rotary power to a shaft 52 and a gear drive system 54 connects shaft 56 to shaft 52 to rotate the shafts in opposite directions. Shafts 52 and 56 extend through the center of stationary cams 32 and 34, respectively, and support suitable means not shown in this FIG for driving the barrels 12 and 14, respectively. For the illustrative purpose of this FIG it should be evident that drive from the motor 50 rotates the shafts 52 and 56 and the barrels attached to those shafts.

Below the assembled forming barrels 12 and 14 is a takeaway conveyor 44 and behind the barrel 14 is a chute 46; these elements being used to receive and convey formed food articles that have been produced as the barrels rotate. The formation of the articles and the use of the takeaway system will be further discussed hereinafter.

FIG. 2 is a front elevation view illustrating the system shown in FIG. 1 and the duplicated support systems at each side thereof.

FIG. 3 is an exploded perspective illustration of the barrels 12 and 14 and illustrating one form of support of the barrels on the shafts 52 and 56. As here illustrated, the barrels 12 and 14 terminate in end plates 58 and 60, respectively, which may be suitably attached as by welding to the interior ends of the barrels. The end plates 58 and 60 are cutout formed at 70 to provide access to the assembly of the forming bars (18, 20, 22) with pistons (28) and piston bars (30). One of the assembled forming bars is shown withdrawn from the drum 12 and the piston bar 30 of that assembly is shown in contact with a cam track 38 in a cam 32. None of the supporting framework of the apparatus is shown in this FIG; however, it should be understood that the elements illustrated are supported by framework of the type suggested in FIG. 1.

FIGS. 4 and 5 are sectional views taken along the cutting lines shown in FIG. 1 with FIG. 4 illustrating the forming barrels 12 and 14, the forming bars 18, 20, 22 and 24, the pistons 28, the piston bars 30, the takeaway conveyor 44 and the chute 46. In this FIG the relative positions of the pistons 28 in the different forming bars are shown. Note that the piston 28 in the upper bar 18 in barrel 12 is at the low part of the cavity 26 whereas the piston 28 in the lower bar 24 in the barrel 14 is extending out of cavity 26 in that bar. The pistons are moved within the cavities as the piston bars 30 are moved as they follow the tracks 38 or 40 in the cams 32 or 34. When the barrels, are aligned in a rotational position as shown in FIG. 4 it should be noted that the cavities 26 of the forming bars 20 and 22 are aligned with each other and the pistons are retracted from the cavities. A food article is being formed in this position of the barrels.

FIG. 5 illustrates the cams 32 and 34 in side elevation and as oriented for the positions of the barrels 12 and 14 as shown in FIG. 4. The cams 32 and 34 have the cam tracks 38 and 40, respectively, and the cam followers 42 of the respective forming bars 18, 20, 22 and 24 are shown in the tracks 38 and 40. It should be noted that the cam tracks 38 and 40 in the cams 32 and 34 are substantially identical but are oriented a little differently within the cam support structure 36 as shown schematically in FIG. 1.

Considering first the action of cam 32 and its track 38, with the orientation as shown in FIG. 5, and with counterclockwise rotation of the barrel 12 as illustrated in FIG. 4, the track 38 in cam 32 will cause the cam follower 42 for the piston bar 30 of the lower forming bar 20 of barrel 12 to begin to move the piston 28 in that cavity 26 outwardly to push articles out of the cavity 26. It should be evident from comparing the action of that piston 28 to the position of the chute 46 in FIG. 4 that the piston is clearing the cavity 26 in the forming bar 20 as the cavity approaches the chute.

Considering now the action of the cam 34 and its track 40, with the orientation as shown in FIG. 5, and with clockwise rotation of the barrel 14 as illustrated in FIG. 4, the track 40 in cam 34 will cause the cam follower 42 of the piston bar 30 of the upper forming bar 22 of barrel 14 to remain in a withdrawn position with respect to its cavity 26 until the barrel has rotated about 90 degrees when the cam follower 42 will follow the track 40 and begin to enter the cavity 26 to push articles out of the cavity 26. As the articles are forced out they will drop into the chute 46 and be carried to the takeaway conveyor 44.

FIG. 6 is a further enlargement and detailed showing, in section, of the forming barrels 12 and 14, the forming bars 18, 20, 22 and 24, the cavities 26, and the pistons 28. In the position illustrated in this FIG, the forming bars 20 and 22 are mated with their cavities 26 aligned. In the form here illustrated, the cavities 26 have double chambers and the pistons 28 are double pistons with a piston operating within each chamber. The supporting and driving shafts 52 and 56 are shown passing through bearings 62 and 64, respectively, in the cams 32 and 34, respectively. The end plates 58 and 60 are shown in the section of the illustration and it should be understood that these end plates are attached by suitable means such as by being welded to the shafts 52 and 56, respectively. The collared end plates 58 and 60 provide the rotary drive to the barrels 12 and 14, respectively.

In FIG. 4 the radial movement on the piston bars within the barrels 12 and 14 can be seen. As shown in the center of the FIG the piston bars are separated from the inside surface of the barrels as the products are being formed and compressed in the cavities 26. In the lower portion of this illustration the piston bar 30 is near the inside surface of the lower barrel 14 and the pistons are in the position to force the product from the cavity. A cutoff wire 81 is shown in FIG. 1 and in FIG. 4 in a position to insure that formed products are cleared to the takeaway conveyor 44.

A feature that distinguishes the food forming machine of the form shown in FIG. 1 from other barrel forming machines is the feature of ease of changing the form of the forming bar. It should be apparent that the forming bar is the only part of the forming barrels that need be changed to change the form of a product being formed. As shown in FIG. 1 and 3 the end plates 58 and 60 are formed with cut-out portions 70 that permit the piston bars 30 to move radially and the circumference of the barrels are machined along their axial surface to provide slots 72 in the exterior of the barrels. The forming bar assemblies which include the forming bars 18, 20, 22 and 24, the pistons 28 and the piston bars 30 are removable from the forming barrels 12 and 14 by being slid out through the machined slots 72. Replacement forming bars with perhaps different cavities may then be inserted into the slots 72 and the barrels 12 and 14 are ready for forming products again. While the supports for the machine have not been specifically shown, it should be understood that such support systems may be designed to permit the easy removal and replacement of the forming bars.

The machine of the present invention is also capable of forming articles that are dimensional only on one side. For that purpose, a forming bar 80 of the type shown in FIG. 7 may be used. This forming bar 80 has no cavities and has an outer surface that would be the same curvature as the curvature of the barrel in which it was installed. With no cavities in the forming bar 80 there would be no need for the piston and piston bar assembly as shown in the other FIGs.

The present invention also contemplates the construction of the forming barrels without inserts of the froming bars. In that form the forming barrels would be a continuous cylindrical form with cavities formed in their exteriors. The cavities of barrels above each other would be aligned to assure that the cavities mate when forming three dimensional products. The cavities would also have a cutout to permit movement of the pistons into the cavities and the assembled mechanism would include the cams, cam followers and piston bars needed to effect the desired movement of the pistons.

The machine of the present invention is adapted to form three dimensional food products from input food materials by using a pair of parallel cylinder-like forming barrels 12 and 14 that are rotatable about parallel axes. The barrels may be a one piece barrel with a continuous cylindrical surface or may be provided with removable forming bars 18, 20, 22 and 24 as shown in FIG. 1 and those bars have a major portion of their outer surface in an axial direction formed to conform or have the same curvature as the outside of the barrels. The exterior of the barrels or the bars may be formed with cavities 26 that establish the contours of the articles being formed in the cavities. A movable piston 28 operates within the cavities and a piston operating means 30 moves the pistons within the cavities. A set of cams 32 and 34 are formed with cam tracks 38 and 40 for timing the movement of the pistons within the cavities and a set of cam followers 42 follow the cam tracks to cause movement of the piston operating means. The machine is also provided with a food material input chamber for passing food materials to the cavities in the barrels and a formed food product takeaway conveyor is provided to convey the formed articles to their next step in production.

The barrels are rotated in counter directions and meet tangentially at their formation position so that food materials are fed through the input chamber to the cavities. At the meeting rotational position, the cavities of forming bars in the opposite barrels are aligned. The further rotation of the barrels causes the food material to be compressed and formed in the cavities. Continued rotation of the barrels is accompanied by radial movement of the piston bars and the resultant movement of the pistons within the cavities. At the appropriate alignment of the cavities, with respect to the takeaway conveyor, the pistons move within the cavities and eject the formed food article to the conveyor.

While certain preferred embodiments of the invention has been specifically disclosed and described, it should be understood that the invention is not limited thereto as many variations will be readily apparent to those skilled in the art and the invention is to be given its broadest possible interpretation within the terms of the following claims.

I claim:

1. A method for producing three dimensional molded food products from formable input food materials supplied under pressure to a sanitizable product forming machine employing a pair of parallel, rotatable, cylinder-like forming barrels, one of said barrels being positioned above the other to establish an upper and lower barrel with the outer surface of said barrels in tangential contact at a food forming position and said formable input food materials being supplied under pressure to said barrels adjacent to said tangential contact at said food forming position, said barrels being respectively rotatable about parallel axes substantially fixed with respect to each other in a manner to establish tangential mating alignment between the external cylinder-like surfaces of said barrels, the outer surface of at least one of said forming barrels having an inwardly cut-out portion to create at least one cavity, a movable means within said cavity, said movable means being movable radially with respect to the axis of rotation of said barrel, and a means for moving said movable means in said radial movement, said means for moving being positioned within said barrel in radial alignment with said cavity, a food material input chamber aligned with said outer surface of said forming barrels adjacent to said position of tangential contact of said barrels, said input chamber being positioned with respect to said position of tangential contact for input of food materials into said cavity in said forming barrel under pressure as said barrels are rotated about their axes, the steps comprising:

(a) rotating said forming barrels, (b) feeding said food material under pressure into said food input chamber and into said cavity within said one of said barrels as said barrels are rotated, (c) continuously rotating said forming barrels to produce said three dimensional molded food products from said input food material forced into said cavity as said barrels are rotated, (d) moving said movable means in said cavity to force said molded food material from said cavity in said one of said barrels as a complete unit after said position of tangential contact has been passed, (e) and controlling said radial movement of said movable means in accord with the rotational position of said forming barrels.

2. The method of claim 1 wherein said movement of said movable means is determined by a pair of stationary cam means that are adjustably positioned in rotational angle with respect to the position of rotation of said forming barrels and with respect to said position of tangential contact of said forming barrels.

3. The method of claim 1 wherein each of said pair of parallel forming barrels has a cavity and said movable means includes a pair of movable means one each of said pair of movable means being associated with one of said pair of parallel forming barrels, the method being controlled such that said movable means are movable after said position of tangential contact of said barrels and said movable means of one of said forming barrels forces said molded food material out of a cavity in the upper of said pair of forming barrels before said movable means associated with the lower of said pair of forming barrels forces said food material from the cavity of said lower forming barrel.

* * * * *